March 31, 1942. W. M. BAILEY 2,277,947
ADJUSTABLE SUPPORT AND LOCKING MECHANISM
Filed May 23, 1940
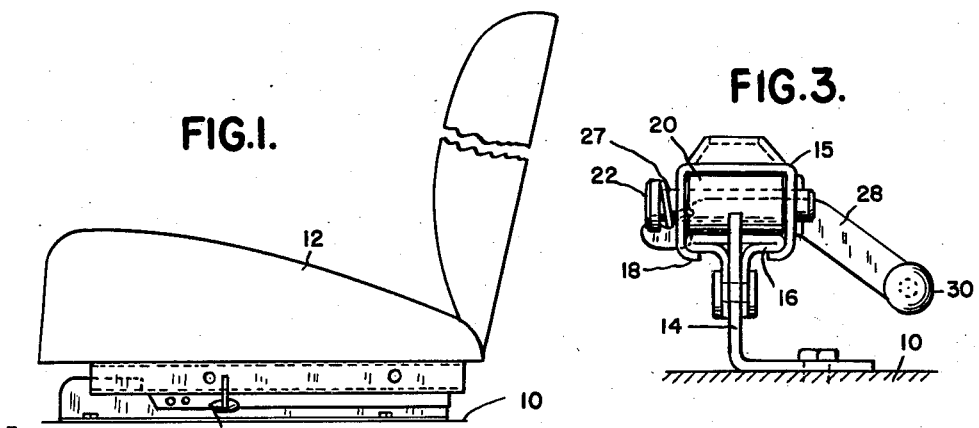
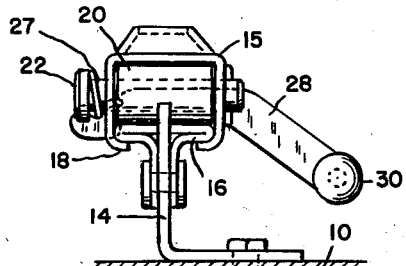
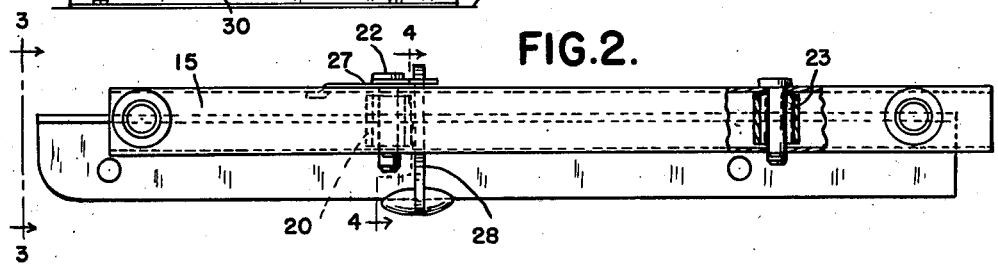
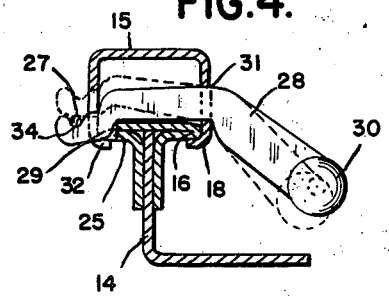
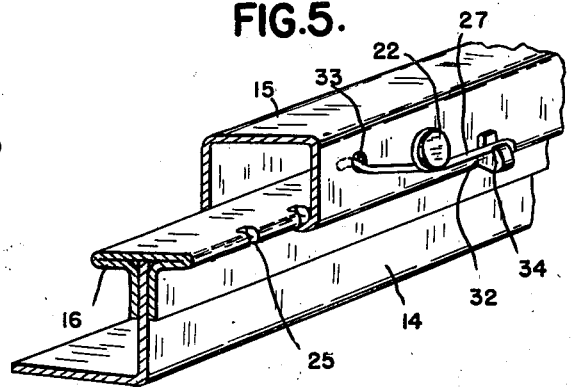
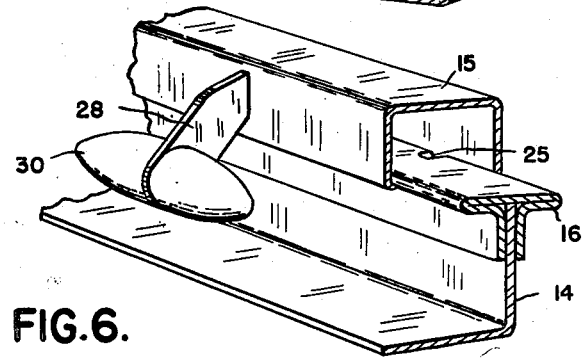
INVENTOR.
WARD M. BAILEY
BY
ATTORNEYS Patented Mar. 31, 1942

2,277,947

UNITED STATES PATENT OFFICE 2,277,947

ADJUSTABLE SUPPORT AND LOCKING MECHANISM

Ward M. Bailey, Pontiac, Mich., assignor to American Forging & Socket Company, Pontiac, Mich., a corporation of Michigan Application May 23, 1940, Serial No. 336,767

4 Claims. (Cl. 155—14)

This invention relates to adjustable seat supporting mechanisms, having as its particular object the provision of improved means for locking the seat against unwanted travel, while nevertheless permitting quick and easy release of the seat, and movement thereof to new adjusted positions, at will.

An important object of the invention is to provide such an improved locking mechanism which is simpler to construct and install than previously known devices of this class, and which consists of but a single strip of sheet metal, loosely mounted in the movable elements constituting the adjustable support, and requiring no special pivot or other securing means. A related object is to provide such a locking device which is held by the slidable parts of the support, in such manner that it can neither escape nor cause any looseness or rattling, while its engagement with the held parts is such as to distribute the strains throughout the structure in a way adapted to reduce wear and distortion.

Other objects and advantages will be apparent from the following description, wherein reference is made to the accompanying drawing illustrating a preferred embodiment of my invention and wherein similar reference numerals designate similar parts throughout the several views.

In the drawing:

Fig. 1 is a somewhat diagrammatic side elevational view of a vehicle seat provided with supporting and locking mechanism constructed in accordance with the present invention, part of the back cushion being broken away.

Fig. 2 is a plan view showing a seat supporting assembly provided with locking means constructed in accordance with the present invention, parts being broken away to show the same in section.

Fig. 3 is a front elevation taken as indicated by the line and arrows 3—3 of Fig. 2.

Fig. 4 is a vertical section taken substantially on the line 4—4 of Fig. 2 and looking in the direction of the arrows.

Fig. 5 is a fragmentary perspective view of a part of the track and carriage assembly, indicating the manner in which spring tension is applied to the locking detent, and Fig. 6 is a similar fragmentary perspective view of the opposite side of the assembly.

Referring now to the drawing: reference character 10 designates a floor, which in the present illustrative disclosure is intended to be that of a motor vehicle body. The seat 12 is supported upon the floor in such manner as to permit longitudinal adjustment at will, while allowing the seat to be locked against movement under normal conditions.

The general features of the supporting mechanism comprise no part of the present invention and the assembly will be recognized by those skilled in the art as of a type now commonly employed. A track section 14 is attached to the floor beneath, and to support, each end of the seat, while a carriage portion 15 rolls over each track section and carries the seat. Since the principal parts of the two track and carriage assemblies are alike, description of one will suffice, supplemented by a description of those differences which do exist between the two assemblies.

The track is provided with a head, 16, of T-section, while the carriage is of inverted channel form, having inbent lower edge flanges 18 underhanging the track and preventing vertical separation of the parts. Rollers 20 are journaled in the carriage channel upon pins as 22. These may incorporate needle-type or other suitable bearings as 23.

A plurality of notches 25 are cut along the inner edge of the track head. A detent 28 carried by the carriage has a nose portion 29 which is normally engaged in one of the slots 25, to hold the carriage against travel, being yieldably maintained in such engagement by the spring 27. The detent comprises a flat sheet metal member projecting laterally through the side webs of the carriage. Slots 31—32 are provided in the carriage to accommodate the detent, which will be seen to lie, and to move, in a vertical plane. One end of the detent projects outwardly from the carriage to carry the handle 30, while the opposite extremity projects a short distance from the opposite side of the carriage, and is notched, as indicated at 34, to receive the end of the spring 27, which is fitted thereinto and urges the same downwardly into engagement with one of the notches 25. The central portion of the spring is wrapped about one of the pins 22, while its opposite end is turned into an opening 33 in the channel, positioned to maintain proper stressing of the spring. The detent is rockable upon the lower edge of the slot 31, while slot 32 is long enough to permit its nose portion to move vertically to and from engagement with the slotted edge of the track. The spring wire 27, by reason of the fact that it bridges the slot 32 and is engaged in the slot 34, locks the detent against removal.

I am aware that the invention may be embodied in other specific forms without departing from the spirit or essential attributes thereof, and I therefore desire the present embodiment to be considered in all respects as illustrative and not restrictive; reference being had to the appended claims rather than to the foregoing description to indicate the scope of the invention.

I claim:

1. In combination with a slidable support of that variety which comprises a track and a carriage in the form of an inverted channel slidable over the track, locking means for holding the carriage against unwanted movement along the track, comprising a detent element extending laterally through said carriage and projecting from both sides thereof, said detent extending through and being vertically movable in slots in the carriage, a handle operatively connected to one projecting end of said detent, and combined biasing and retaining means comprising spring means operatively engaging and interlocked with said detent adjacent a portion of the carriage, but on the opposite side of said carriage portion from that occupied by the part of the detent connected to the handle, said spring means bridging the slot through which said end extends, to prevent removal of the detent.

2. In combination with a slidable support of the variety which comprises a track and a carriage in the form of an inverted channel slidable over the track, locking means for holding the carriage against unwanted movement along the track, comprising a sheet metal detent extending laterally through said carriage and projecting from both sides thereof, said detent extending through and being vertically movable in slots in the carriage, means operatively connected to one projecting end of said detent for moving the same in a vertical plane to and from holding engagement with the track, and combined biasing and holding means comprising a spring reacting against the carriage and having a portion interlocked with said detent to prevent unwanted longitudinal movement of the latter, and bridging the slot through which said end extends upon the opposite side of at least a part of the carriage from said means for moving the detent, said spring wire bearing against the detent to normally maintain a portion thereof in holding engagement with the track.

3. An adjustable seat support construction comprising in combination with a track, a carriage slidable over the track and having spaced, substantially parallel side flanges, locking means for holding the carriage against unwanted movement, comprising a sheet metal detent extending transversely through oppositely disposed slots in said flange portions, one end of said detent being movable to and from holding engagement with the track, and the other end of said detent being rockable in the slot through which it extends, spring means bearing against said detent to normally urge the same into holding engagement with the track and interlocked with said detent to prevent the same from sliding out of the slots, and means for actuating said other end of the detent.

4. An adjustable seat supporting construction as set forth in claim 3 including roller means interposed between said track and carriage, a supporting journal pin for said roller means arranged adjacent said detent, said spring means being wrapped about said journal pin and extending through a part of said detent to provide said interengagement and bridging the slot through which the detent extends to block unwanted sliding of the detent through said slot.

WARD M. BAILEY.